US012671696B2

(12) United States Patent
Tager et al.

(10) Patent No.: US 12,671,696 B2
(45) Date of Patent: Jun. 30, 2026

(54) SYSTEM AND METHOD FOR EXCESSIVE COMPUTING INTERFACE BEHAVIOR DETECTION AND MITIGATION

(71) Applicant: Noname Gate Ltd., Tel Aviv-Jaffa (IL)

(72) Inventors: Idan Tager, Givatayim (IL); Adi Chen Arbib, Netanya (IL); Yuval Alkalai Tavori, Ramat Gan (IL); Shai Meir, Tzur Yitzhak (IL); Amos Itamar Avni, Tel Aviv (IL)

(73) Assignee: Akamai Technologies, Inc., Cambridge, MA (US)

( * ) Notice: Subject to any disclaimer, the term of this patent is extended or adjusted under 35 U.S.C. 154(b) by 126 days.

(21) Appl. No.: 18/543,099

(22) Filed: Dec. 18, 2023

(65) Prior Publication Data

US 2025/0200176 A1      Jun. 19, 2025

(51) Int. Cl.
| *H04L 9/40* | (2022.01) |
| *H04L 41/142* | (2022.01) |
| *H04L 41/147* | (2022.01) |
| *H04L 41/149* | (2022.01) |
| *H04L 41/16* | (2022.01) |

(52) U.S. Cl.
CPC ............ *H04L 63/14* (2013.01); *H04L 41/142* (2013.01); *H04L 41/147* (2013.01); *H04L 41/149* (2022.05); *H04L 41/16* (2013.01); *H04L 63/1408* (2013.01)

(58) Field of Classification Search
CPC ..... H04L 63/14; H04L 41/142; H04L 41/147; H04L 41/149; H04L 63/1408; H04L 41/16
See application file for complete search history.

(56) References Cited

U.S. PATENT DOCUMENTS

| 8,887,286 B2 | 11/2014 | Dupont et al. |
| 9,104,525 B2 | 8/2015 | Dang et al. |
| 9,448,859 B2 | 9/2016 | Gathala et al. |
| | (Continued) | |

FOREIGN PATENT DOCUMENTS

| EP | 3531329 A1 | 8/2019 | |
| EP | 4027276 A1 | 7/2022 | |
| WO | WO-2024154144 A1 * | 7/2024 | ............. G06N 3/045 |

OTHER PUBLICATIONS

PCT/US2024/060736, International Search Report and Written Opinion, mailed on Apr. 17, 2025, 9 pages.

*Primary Examiner* — Shirley X Zhang
(74) *Attorney, Agent, or Firm* — David H. Judson

(57) ABSTRACT

A system and method for mitigating cyber threats based on excessive computing interface usage behaviors. A method includes creating a baseline with respect to at least one computing interface usage metric, wherein each computing interface usage metric is defined with respect to computing interface usage by a user, wherein creating the baseline further comprises training an anomaly detection machine learning model using a training set including a plurality of training values for the at least one computing interface metric; detecting an anomaly in calls made by the user based on at least one deviation from the baseline above a threshold, wherein detecting the anomaly further comprises applying the anomaly detection machine learning model to a plurality of features including values of the at least one computing interface usage metric for the calls made by the user; and mitigating the detected anomaly.

19 Claims, 6 Drawing Sheets

(56)          References Cited

U.S. PATENT DOCUMENTS

| | | | |
|---|---|---|---|
| 9,720,746 | B2 | 8/2017 | Zhu et al. |
| 9,846,771 | B2 | 12/2017 | Gaddipati et al. |
| 11,663,110 | B2 | 5/2023 | Dolby et al. |
| 2018/0019931 | A1 | 1/2018 | Jalan et al. |
| 2018/0115578 | A1* | 4/2018 | Subbarayan ........ G06F 21/6281 |
| 2022/0232023 | A1 | 7/2022 | Levi et al. |

\* cited by examiner

SYSTEM AND METHOD FOR EXCESSIVE COMPUTING INTERFACE BEHAVIOR DETECTION AND MITIGATION

TECHNICAL FIELD

The present disclosure relates generally to cybersecurity related to computing interfaces such as application programming interfaces (APIs), and more specifically to securing computing environments based on computing interface behavior.

BACKGROUND

The vast majority of cybersecurity breaches can be traced back to an issue with a computer interface such as an application programming interface (API). API abuses are expected to become the most frequent attack vector in the future, and insecure APIs have been identified as a significant threat to cloud computing.

An API is a computing interface. A computing interface is a shared boundary across which two or more separate components of a computer system exchange information. Computing interfaces therefore allow disparate computing components to effectively communicate with each other despite potential differences in communication format, content, and the like. An API defines interactions between software components.

In modern computing architectures, the backend acts like a direct proxy for data. As a result, a flawed API can lead to exposure of sensitive data, account takeovers, and even denial of service (DOS) attacks. As a result, securing APIs is a top priority of many computing services providers.

Some existing solutions for detecting API abuse have been created. These solutions typically look at communications between a computing architecture and one or more external systems through an API to detect abnormal traffic. These solutions face challenges in adapting to new and constantly evolving threats. Techniques for improving accuracy of abnormality detection and more flexibly adapting to threats are always desirable.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for mitigating cyber threats based on excessive computing interface usage behaviors. The method comprises: creating a baseline with respect to at least one computing interface usage metric, wherein each computing interface usage metric is defined with respect to computing interface usage by a user, wherein creating the baseline further comprises training an anomaly detection machine learning model using a training set including a plurality of training values for the at least one computing interface metric; detecting an anomaly in calls made by the user based on at least one deviation from the baseline above a threshold, wherein detecting the anomaly further comprises applying the anomaly detection machine learning model to a plurality of features including values of the at least one computing interface usage metric for the calls made by the user; and mitigating the detected anomaly.

Certain embodiments disclosed herein also include a non-transitory computer readable medium having stored thereon causing a processing circuitry to execute a process, the process comprising: creating a baseline with respect to at least one computing interface usage metric, wherein each computing interface usage metric is defined with respect to computing interface usage by a user, wherein creating the baseline further comprises training an anomaly detection machine learning model using a training set including a plurality of training values for the at least one computing interface metric; detecting an anomaly in calls made by the user based on at least one deviation from the baseline above a threshold, wherein detecting the anomaly further comprises applying the anomaly detection machine learning model to a plurality of features including values of the at least one computing interface usage metric for the calls made by the user; and mitigating the detected anomaly.

Certain embodiments disclosed herein also include a system for mitigating cyber threats based on excessive computing interface usage behaviors. The system comprises: a processing circuitry; and a memory, the memory containing instructions that, when executed by the processing circuitry, configure the system to: create a baseline with respect to at least one computing interface usage metric, wherein each computing interface usage metric is defined with respect to computing interface usage by a user, wherein creating the baseline further comprises training an anomaly detection machine learning model using a training set including a plurality of training values for the at least one computing interface metric; detect an anomaly in calls made by the user based on at least one deviation from the baseline above a threshold, wherein detecting the anomaly further comprises applying the anomaly detection machine learning model to a plurality of features including values of the at least one computing interface usage metric for the calls made by the user; and mitigate the detected anomaly.

Certain embodiments disclosed herein include the method, non-transitory computer readable medium, or system noted above or below, further including or being configured to perform the following step or steps: detecting a change in computing interface deployment in a computing environment based on traffic across a plurality of paths in the computing environment.

Certain embodiments disclosed herein include the method, non-transitory computer readable medium, or system noted above or below, wherein the at least one computing interface usage metric used to create the baseline is measured after the change in computing interfaced deployment is detected.

Certain embodiments disclosed herein include the method, non-transitory computer readable medium, or system noted above or below, further including or being configured to perform the following step or steps: analyzing data related to the computing interface usage in a plurality of cycles, wherein analyzing the data in each cycle further comprises performing a comparison between at least one cycle result for the cycle and historical data, wherein the change in computing interface deployment is detected based on the comparisons in the plurality of cycles.

Certain embodiments disclosed herein include the method, non-transitory computer readable medium, or system noted above or below, further including or being configured to perform the following step or steps: updating a first worker node data structure of a plurality of worker node data structures by a first worker node of a plurality of worker nodes, wherein each worker node is an instance of software assigned to a respective worker node data structure of the plurality of worker node data structures, wherein each worker node is an instance of software assigned to a respective worker node data structure of the plurality of worker node data structures; and merging the updated first worker node data structure with a first synced data structure into a second synced data structure, wherein the at least one cycle result for each cycle includes the second synced data structure created during the cycle.

Certain embodiments disclosed herein include the method, non-transitory computer readable medium, or system noted above or below, further including or being configured to perform the following step or steps: parsing traffic by the first worker node; and inspecting packets of the parsed traffic by the first worker node, wherein the first worker node data structure is updated based on the inspection.

Certain embodiments disclosed herein include the method, non-transitory computer readable medium, or system noted above or below, wherein each worker node data structure corresponds to a respective cycle of the plurality of cycles, wherein each worker node data structure includes a plurality of nodes, wherein each node of each worker node data structure includes data of calls made during the corresponding cycle.

Certain embodiments disclosed herein include the method, non-transitory computer readable medium, or system noted above or below, further including or being configured to perform the following step or steps: determining a type of cyber threat for the detected anomaly, wherein the anomaly is mitigated based further on the determined type of cyber threat.

Certain embodiments disclosed herein include the method, non-transitory computer readable medium, or system noted above or below, wherein the calls made by the user are a second plurality of calls, wherein the computing interface usage by the user is based on a first plurality of calls made by the user.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
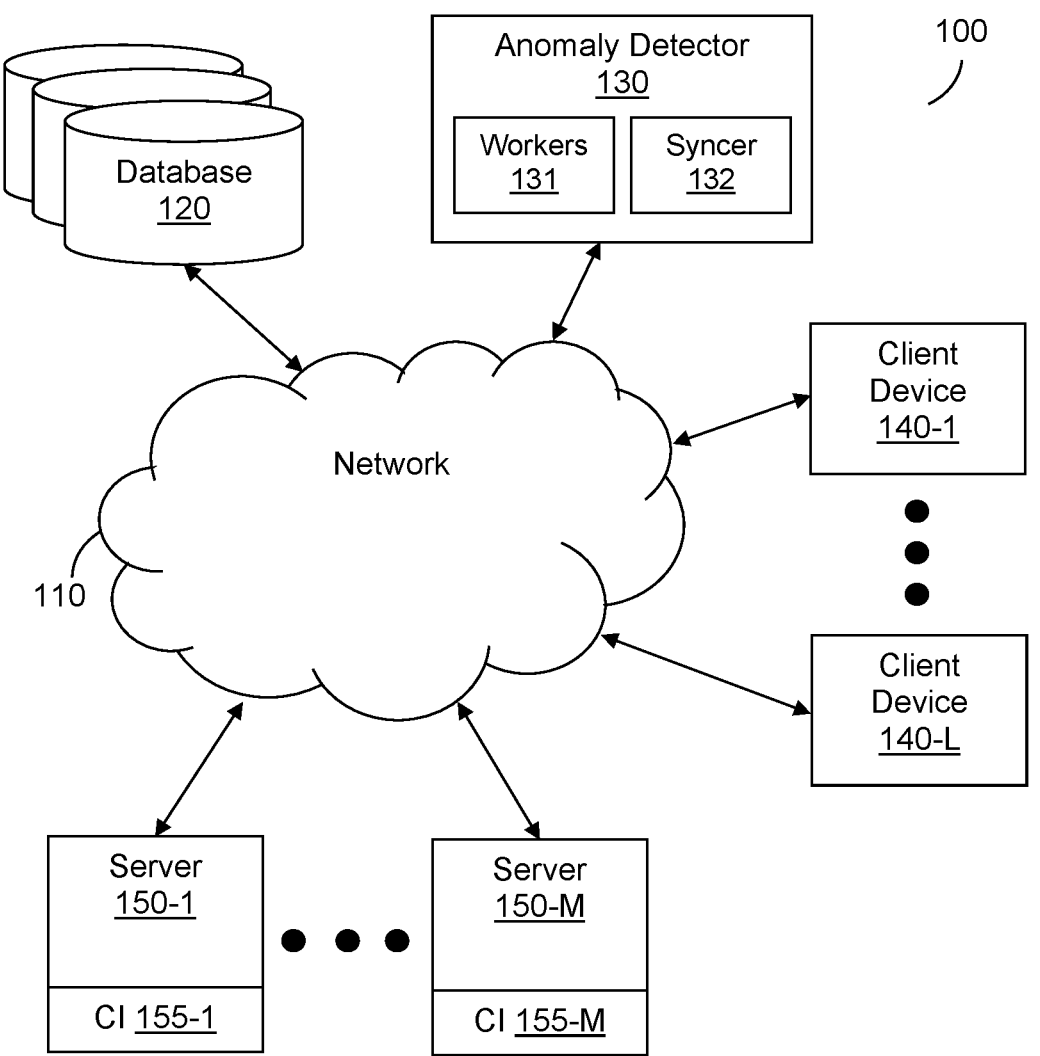
FIG. 1 is a network diagram utilized to describe various disclosed embodiments.

The various disclosed embodiments include methods and systems for detecting and mitigating potential cyber threats detected based on excessive behavior. Various embodiments disclosed herein leverage machine learning techniques in order to establish baselines and detect excessive behavior which may be indicative of cyber threats. More specifically, the disclosed embodiments provide various techniques for detecting excessive behavior defined at least partially with respect to usage of computing interfaces such as, but not limited to, application programming interfaces (APIs).

In some embodiments, excessive behavior may be determined based on global behavioral anomalies, local behavioral anomalies, or a combination thereof. In a further embodiment, distributions for observed metrics are learned, and anomalous values may be detected based on their respective distances from the distribution. In yet a further embodiment, respective distributions are defined for different aspects related to computing interface usage such as, but not limited to, amounts of time since a computing interface was discovered or otherwise since the computing interface was deployed in a given computing environment, a number of users which utilize the computing interface, a number of hits for the computing interface, response codes being used by the computing interface, authentication mechanisms being used by the computing interface, Internet Protocol (IP) geolocations of computing interface calls or other usage of the computing interface, data seasonality of data accessed or utilized by the computing interface, combinations thereof, and the like.

In an embodiment, computing interface usage data is analyzed in cycles, with each cycle being a period of time since a last cycle ended (e.g., a predetermined period of time). In each cycle, a new instance of a worker node is instantiated, and the new instance of the worker node may utilize parser services in order to parse traffic and inspect packets in order to update respective worker node data structures. Each worker node is an instance of at least a portion of software (e.g., a code or portion of code) configured to manage a respective worker node data structure corresponding to a given cycle (i.e., the cycle in which the respective worker node is instantiated). The worker node data structures may represent respective paths of calls to computing interfaces observed in traffic, for example, calls among a chain of calls to computing interfaces as calls are made to and between computing interfaces.

The packet inspection performed by each worker node is performed in order to determine information about calls to computing interfaces or other uses of computing interfaces which may be measured by, for example, counting the number of computing interface calls meeting certain criteria. Such criteria may include, but is not limited to, computing interface type, authentication type used for authenticating to a computing interface, data types of data being passed to or requested from a computing interface, combinations thereof, and the like.

The worker node data structures managed by the worker nodes are merged by a syncer in each cycle once the worker nodes have updated their respective worker node data structures in order to yield a synced data structure. More specifically, a worker node data structure of a current or otherwise most recent cycle may be merged, for example, with a synced data structure from a previous cycle (e.g., the synced data structured created from the cycle immediately before the most recent cycle). The syncer may be realized as, for example but not limited to, an instance of at least a portion of software, and is configured to compare the synced data structure to data from a previous cycle (e.g., a synced data structure yielded by a previous cycle) and, based on that comparison, any changes in computing interfaces deployed in a computing environment from a previous cycle are detected. Upon such detection of a change in computing interfaces, a new baseline may be created and monitored for anomalies.

Various disclosed embodiments provide techniques for analyzing behavior in order to detect excessive behavior which may therefore allow for detecting new kinds of indicators of cyber threats. Accordingly, the disclosed embodiments enable defining rules or procedures with respect to these new indicators of cyber threats, which in turn allows for identifying more cyber threats which may need to be mitigated in order to protect a computing environment.

The disclosed embodiments may be utilized to detect different kinds of attacks that may involve many attempts at unauthorized access or other unauthorized activity such as, but not limited to, brute force and scraping. It has been identified that excessive or otherwise unusual computing interface usage may be utilized in order to more accurately detect behavior indicating potential cyber threats.

In this regard, it is noted that computing interfaces such as APIs used within a given computing environment are frequently evolving, both in terms of new APIs being implemented and reintroduction of APIs after updates which may lead to changes in behavior that may or may not actually represent a cyber threat. Accordingly, pre-learning or pre-labeling APIs and using predetermined behavioral models is not feasible and would result in many false positives and negatives in threat detection. The excessive behavior detection techniques described herein may be utilized to learn usage patterns with respect to computing interfaces based on observed metrics and to detect anomalies representing potential cyber threats using the usage patterns as a baseline.

Moreover, various disclosed embodiments provide techniques for detecting changes in computing interfaces which may allow for more efficiently and accurately establishing baselines, for example, by reestablishing baselines only when actual changes in computing interfaces occur rather than merely updating baselines periodically, or otherwise establishing and reestablishing baselines in order to reflect a current state of a computing environment vis-à-vis computing interfaces used by software components within the environment.

Additionally, due to the rapidly evolving use of computing interfaces in many computing environments, it is not feasible to manually monitor all API or other computing interface usage in order to detect potential anomalies. In addition to the significant amount of manual labor which would be required for such manual monitoring, human operators would not be capable of timely addressing every potential behavioral issue with respect to API usage. Even further, such manual monitoring would rely on subjective evaluations by human operators regarding whether API usage is excessive. The disclosed embodiments provide various objective, rules-based techniques for detecting excessive behavior with respect to computing interface usage which differ from the subjective analysis a human observer might utilize to manually determine excessive computing interface usage behaviors.

FIG. 1 shows an example network diagram 100 utilized to describe the various disclosed embodiments. In the example network diagram 100, one or more databases 120, an anomaly detector 130, client devices 140-1 through 140-L (where L is an integer having a value equal to or greater than 1), and servers 150-1 through 150-M (where M is an integer having a value equal to or greater than 1) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The databases 120 store data related to existing computing interfaces such as, but not limited to, application programming interfaces (APIs). Such data may include, but is not limited to, computing interface names of specific instances of computing interfaces (e.g., as indicated in historical computing interface calls), computing interface calls made to computing interfaces such as the computing interfaces 155, statistical data related to historical computing interface usage, combinations thereof, and the like. The data may be utilized in order to establish an initial baseline which can be further improved via training as described herein.

The anomaly detector 130 is configured to perform at least a portion of the disclosed embodiments related to detecting anomalies in computing interface behavior and, more specifically, to excessive behaviors in computing interface usage. The anomaly detector 130 may deploy worker nodes (workers) 131 and a syncer 132, where each of the worker nodes 131 and the syncer 132 may be a logical component realized as an instance of software executed using a processing circuitry and a memory of the anomaly detector 130.

Each of the client devices 140 may be, but is not limited to, a personal computer, a laptop, a tablet computer, a smartphone, a wearable computing device, or any other device configured to make computing interface calls to services hosted by the servers 150. The servers 150, in turn, host services used by the client devices 140, and utilize computing interfaces 155 in order to facilitate delivering those services. Computing interface calls made to the computing interfaces 155 among the servers 150 may be identified and analyzed for excessive behavioral anomalies as described herein.

It should be noted that FIG. 1 depicts an "out-of-path" implementation in which the anomaly detector 130 is deployed out of line, i.e., not as a middle system between servers among the servers 150. In certain implementations, the anomaly detector 130 may be deployed in line between any or all of the servers 150, or multiple instances (not shown) of the anomaly detector 130 may be deployed between servers among the servers 150, without limitation on the disclosed embodiments.

Further, the services hosted by the servers 150 may be "internal services" hosted on the servers 150, but the disclosed embodiments are equally applicable to implementations in which those internal services of the servers 150 may communicate with one or more "external services" hosted on servers other than the servers 150 (not shown). As a non-limiting example, the servers 150 may be servers operated by one entity in a first network environment, and the services hosted by the servers 150 may access services hosted by another entity in one or more other network environments.

Figure 2:
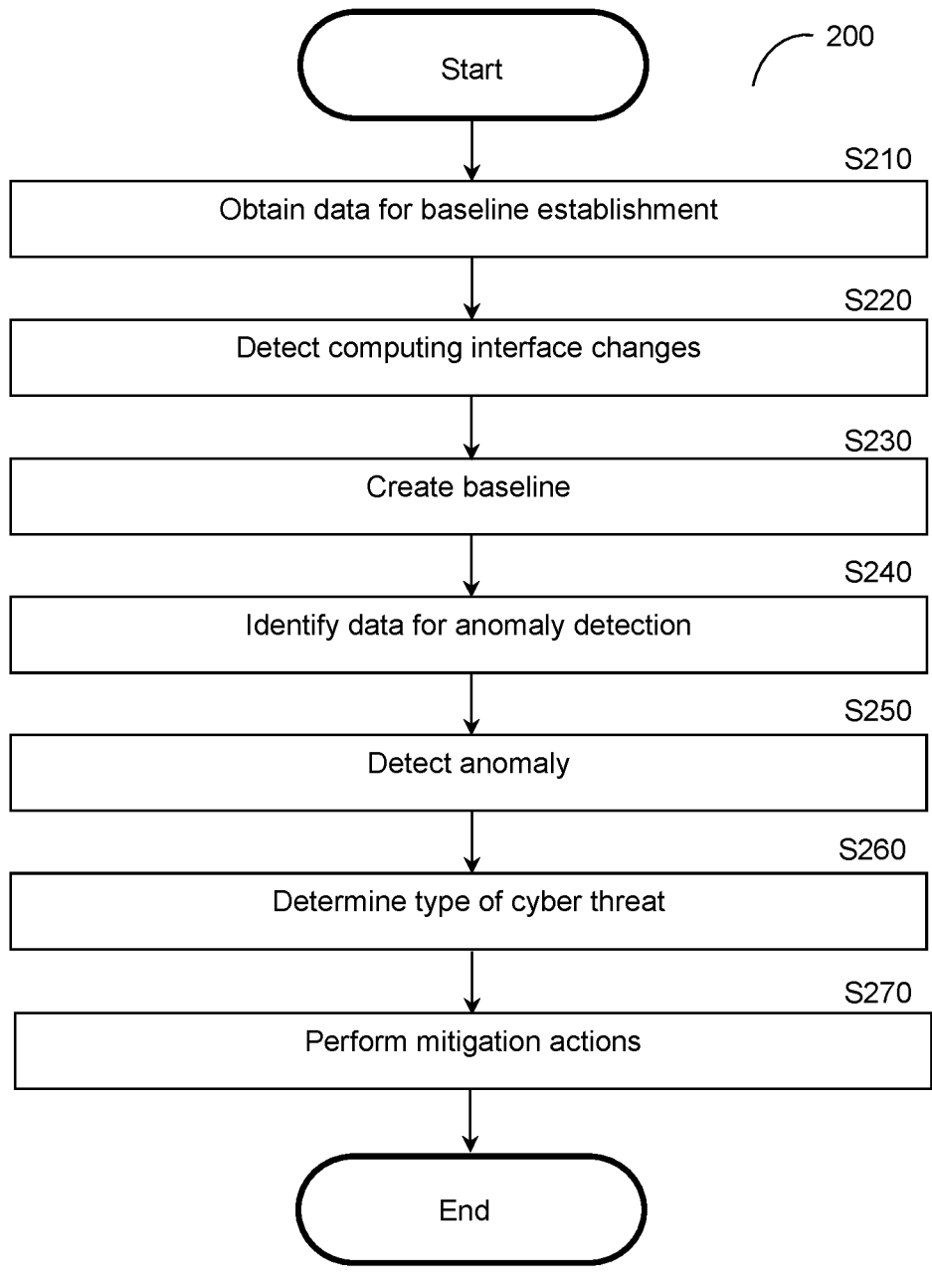
FIG. 2 is a flowchart illustrating a method for mitigating excessive behavior according to an embodiment.

FIG. 2 is a flowchart 200 illustrating a method for mitigating excessive behavior according to an embodiment. In an embodiment, the method is performed by the anomaly detector 130, FIG. 1.

At S210, data for establishing a baseline is obtained. The data may include, but is not limited to, historical data related to computing interface usage. As a non-limiting example, S210 may include retrieving data stored in one or more of the databases 120, FIG. 1.

At S220, one or more computing interface changes are detected. The computing interface changes may be or may include, but are not limited to, changes in computing interface deployment (e.g., deployment of a new computing interface that was not previously deployed in a computing environment), reconfigurations of existing computing interfaces in a computing environment, both, and the like. The changes may be detected based on traffic within a computing environment, and calls made within the computing environment including calls to computing interfaces.

In an embodiment, S220 includes analyzing computing interface usage data in cycles, with each cycle being a timeframe occurring in a period of time since a last cycle ended (e.g., a predetermined period of time or a period of time including a threshold amount of traffic). In a non-limiting example implementation, each cycle is a period of time between several seconds and one minute. In each cycle, worker nodes parse traffic and inspect packets in order to update respective worker node data structures, where each worker node manages a respective worker node data structure.

As noted above, the worker nodes may be or may include instances of software, where each instance of software includes the code for managing a worker node data structure, and each worker node may be assigned to a respective worker node data structure (e.g., the worker node data structure corresponding to the cycle for which the worker node data structure was instantiated or otherwise assigned to that worker node data structure). The worker node data structures may represent respective paths of calls to computing interfaces observed in traffic, for example, calls among a chain of calls to computing interfaces as calls are made to and between computing interfaces. An example method for detecting computing interface changes is described further below with respect to FIG. 3.

At S230, a baseline is created with respect to usage behavior for a computing interface. In other words, the baseline is defined with respect to use of a given computing interface such that the baseline effectively defines normal user behavior for that computing interface.

In an embodiment, creating the baseline includes applying a machine learning algorithm in order to train a machine learning model, thereby effectively learning a distribution for the computing interface metrics. To this end, training data related to historical calls including values for respective computing interface usage metrics of those historical calls is used to train the machine learning algorithm. In a further embodiment, the machine learning model is an anomaly detection model trained to detect anomalies based on subsequent inputs including values for the computing interface usage metrics of subsequent calls.

To this end, such an anomaly detection model may utilize one or more thresholds learned via training, where values for metrics that exceed the thresholds (e.g., when a distance between certain values is greater than a distance threshold) may be detected as anomalous. In this regard, the machine learning anomaly detection model is trained so as to effectively learn a distribution for the computing interface usage metrics, where deviations from normal values within this distribution may be detected as anomalies.

In some embodiments, the baseline may be further defined per user. In other words, the baseline may be defined with respect to usage behavior for a given computing interface by a given user such that the baseline further defines normal behavior for the computing interface with respect to the user. To this end, in such an embodiment, the computing interface usage metrics used to define the baseline may be determined based on calls made by the user, including calls to the computing interface made by the user.

In an embodiment, the baseline is created when a computing interface change is detected, for example at S220. New baselines may be created as new computing interfaces are deployed or otherwise when changes to computing interfaces occur. In this regard, it is noted that a newly deployed or reconfigured computing interface will often display behavior which is abnormal compared to existing baselines such that its behavior may be determined as anomalous if a new baseline is not established in order to track the new (or reconfigured) computing interface's behavior. To this end, when a computing interface change is detected, a new baseline may be established using training data including data collected since the computing interface change was detected.

In an embodiment, S230 further includes establishing one or more anomalous behavior thresholds with respect to the baseline. The anomalous behavior thresholds may be, but are not limited to, thresholds defined with respect to respective computing interface usage metrics among the baseline such that, if observed behavior with respect to use of the computing interface deviates from the baseline above the threshold (e.g., a value of a computing metric is above or below the baseline by at least a value of the respective threshold), the observed behavior may be detected as anomalous. To this end, in a further embodiment, S230 includes calculating one or more such thresholds. The thresholds may be calculated, for example but not limited to, based on the baseline (e.g., as a percentage of a metric among the baseline or otherwise using a calculation based on such a metric).

The metrics used to establish the baseline may be global to a user (e.g., based on usage of any or all computing interfaces by a given user) or may be local to a computing interface used by the user. Accordingly, excessive behavior defined with respect to such metrics may include, but is not limited to, behavior having values exceeding a threshold value for the metric or otherwise deviation from a normal value for the metric above a threshold. Moreover, excessive behavior with respect to one of these metrics may be utilized to identify different types of anomalies, i.e., types of anomalies may be defined with respect to the kind of behavior measured via a given metric. In turn, types of anomalies may aid in, for example, determining potential types of cyber threats which may be posed by anomalous behavior as described further below.

Non-limiting example global metrics for a user may include global aggregated response length (e.g., aggregated response lengths for the user such that excessive behavior for the metric includes above a maximum value of aggregated length among responses), global user errors (e.g., number of user errors for the user such that excessive behavior for the metric includes a number of user errors above a maximum number of user errors produced by computing interface calls made by the user), global server errors (e.g., number of server errors caused by the user such that excessive behavior for the metric includes a number of server errors above a maximum number of server errors produced by computing interface calls made by the user in a given time period), global data retrieval (e.g., defined via a number of sensitive data types returned in responses to computing interface calls made by the user such that excessive behavior for the metric includes a number of sensitive data types returned in responses exceeding a maximum number of response sensitive data types), requests for non-existent resources or path rename errors (e.g., a number of path errors as a result of calls to the computing interface by the user such that excessive behavior for the metric may include a number of path errors above a maximum number of path errors), and the like.

Non-limiting example local metrics for a computing interface used by a user may include aggregated response length (e.g., aggregated response lengths for calls to the computing interface made by the user such that excessive behavior for the metric includes above a maximum value of aggregated length among responses), user errors (e.g., number of user errors caused by calls to the computing interface made by the user such that excessive behavior for the metric includes a number of user errors above a maximum number of user errors produced by computing interface calls made by the user), server errors (e.g., number of server errors caused by calls to the computing interface made by the user such that excessive behavior for the metric includes a number of server errors above a maximum number of server errors produced by computing interface calls made to the computing interface by the user in a given time period), data retrieval (e.g., defined via a number of sensitive datatypes returned in responses to computing interface calls made to the computing interface by the user such that excessive behavior for the metric includes a number of sensitive data types returned in responses exceeding a maximum number of response sensitive data types), computing interface usage (e.g., a defined with respect to a number of hits for a particular status such as status code 200 for calls to the computing interface made to the user such that excessive behavior for the metric includes a number of hits for calls to the computing interface made by the user returning a particular status code above a maximum number of hits), and the like.

In an embodiment, the baseline may be defined with respect to a cycle, for example, such that the baseline effectively represents normal behavior for use of the computing interface in a given cycle. Defining a baseline with respect to a cycle allows for conserving computing resources by minimizing the amount of data which must be stored for each baseline while allowing accurate anomaly detection as well as minimizing the number of instances of passing over incoming user data (for example, once each subsequent cycle) required for anomaly detection.

As noted above, deployments of computing interfaces within modern computing environments are frequently evolving in ways that may lead to changes in behavior. As a result, pre-learning or pre-labeling computing interfaces and using predetermined behavior models would result in a large number of false positives and negatives in anomaly detection. By detecting changes in computing interface deployment and creating baselines when such changes are detected, baselines may be created for newly deployed or redeployed computing interfaces on an as-needed basis, which both improves efficiency of learning by only establishing baselines for newly deployed or redeployed computing interfaces as well as improves accuracy of anomaly detection by learning baselines for computing interfaces using only data collected after each respective computing interface is deployed or redeployed.

At S240, data to be used for anomaly detection is identified. In an embodiment, S240 includes monitoring computing interface calls in a computing environment including, but not limited to, calls to the computing interface of the baseline.

At S250, an anomaly is detected based on the data identified at S240. In an embodiment, the anomaly is detected when one or more metrics related to computing interface usage observed in the data identified at S240 deviates from the baseline. In a further embodiment, the anomaly is detected when a value of one or more of the observed metrics is at least a threshold distance from the baseline (e.g., using one of the thresholds calculated as discussed above with respect to S230). In an embodiment, detecting the anomaly includes applying the machine learning anomaly detection model to a set of features including values of the computing interface metrics for the calls made by a user (i.e., calls among the data identified at S240).

In an embodiment, the detected anomaly is a global behavioral anomaly or a local behavioral anomaly. In a further embodiment, anomalous values are detected based on their respective distances from learned distributions for observed metrics. In yet a further embodiment, respective distributions used for anomaly detection are defined for different aspects related to computing interface usage such as, but not limited to, amounts of time since a computing interface was discovered or otherwise since the computing interface was deployed in a given computing environment, a number of users which utilize the computing interface, a number of hits for the computing interface, response codes being used by the computing interface, authentication mechanisms being used by the computing interface, Internet Protocol (IP) geolocations of computing interface calls or other usage of the computing interface, data seasonality of data accessed or utilized by the computing interface, combinations thereof, and the like.

At S260, a type of cyber threat is determined for the detected anomaly. In an embodiment, the type of cyber threat is determined as described further below with respect to FIG. 4.

At S270, one or more mitigation actions are performed with respect to the detected anomaly. In an embodiment, the mitigation actions to be performed are determined based on the type of cyber threat. To this end, in such an embodiment, S270 further includes determining the mitigation actions to be performed.

Figure 3:
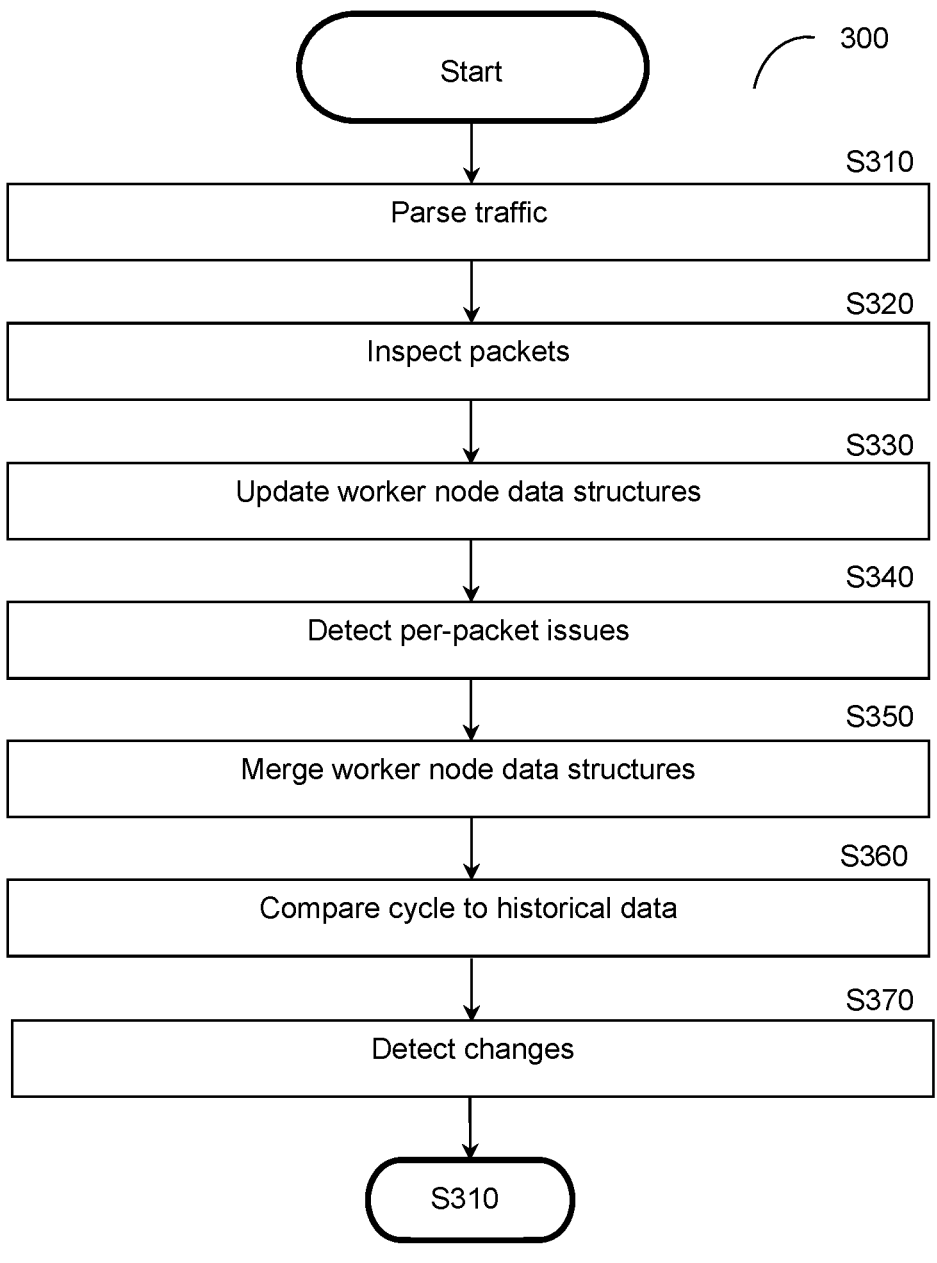
FIG. 3 is a flowchart illustrating a method for detecting computing interface changes according to an embodiment.

FIG. 3 is a flowchart 300 illustrating a method for detecting computing interface changes according to an embodiment. In an embodiment, the method is performed by the anomaly detector 130, FIG. 1.

As an initial note, FIG. 3 depicts an iteration of a cycle in which worker node data structures were previously initialized. During a first cycle in which there are no worker node data structures from previous cycles, worker node data structures may be initialized using a default or other predetermined starting configuration and then updated based on packet inspection as described and merged into a synced data structure as described below with respect to S310 through S350. During subsequent cycles, additional steps as described below with respect to S310 through S370 may be performed.

At S310, traffic is parsed. The traffic may be parsed in order to identify information such as, but not limited to, computing interfaces which were called, authentication methods, users, types of data, and the like. The parsed traffic information may be utilized to determine aggregated values, statistical values, or other values representing aspects of computing interface usage indicated in the traffic as described further herein.

At S320, packets among the parsed traffic are inspected. In an embodiment, the packets may be inspected by one or more instances of software such as, but not limited to, the worker nodes 131, FIG. 1. In a further embodiment, each of the worker nodes maintains a respective worker node data structure, and the packet inspection is performed in order to determine information to be used for updating its respective worker node data structure.

The packet inspection performed by each worker node is performed in order to determine information about calls to or other uses of computing interfaces which may be measured by, for example, counting the number of computing interface calls meeting certain criteria. Such criteria may include, but is not limited to, computing interface type, authentication type used for authenticating to a computing interface, data types of data being passed to or requested from a computing interface, combinations thereof, and the like.

In an embodiment, S320 includes performing packet pair processing. In a further embodiment, for each request-response pair including a packet of a given request and a packet of a response to that request, the packets of the request-response pair are inspected and analyzed. Based on the inspection, one or more aspects of the request-response pair which may be related to computing interfaces are determined. Such request-response pair aspects may include, but are not limited to, computing interface types (e.g., REST, SOAP, GraphQL, gRPC, etc.), authentication types (e.g., header, cookie, query string, etc.), types of data involved (e.g., credit card, social security number, email, phone number, etc.), combinations thereof, and the like.

At S330, an updated worker node data structure is generated based on the inspection of the packets at S320. As noted above, each worker node data structure may be maintained by a respective worker node. In an embodiment, each worker node data structure corresponds to a respective cycle and is generated based on a set of calls observed in the traffic during a given cycle (e.g., calls among request packets inspected at S320). In this regard, at least some of the traffic indicates calls to computing interfaces such as APIs such that the calls reflect usage of the computing interfaces which can be analyzed as described herein.

In a further embodiment, each worker node data structure may include multiple sub-structures (e.g., branches of trees or otherwise sub-trees). The sub-structures may correspond to, for example but not limited to, respective computing interfaces. As a non-limiting example, different sub-trees of a worker node data structure tree may represent respective APIs, and may include data based on calls to their respective APIs in a given cycle.

In an embodiment, each worker node data structure holds data including a collection of features which may be related to accessing a given path. Such path features may include, but are not limited to, timestamps (e.g., a timestamp indicating a first time at which a call including the path is used, a timestamp indicating a last time at which a call including the path is used, etc.), a number of users who used calls including the path, a number of requests including the call to access the path, other statistical and behavioral values of calls including the path, and the like. Collectively, the call features across the different data structures effectively define computing interface usage in a way that allows for recognizing patterns in computing interface usage.

In a non-limiting example implementation, each worker node data structure may be realized as a tree data structure. A non-limiting example worker node data structure which may be maintained by a worker node in accordance with such an embodiment is described further below with respect to FIG. 5.

At S340, any per-packet issues are detected. In an embodiment, S340 includes analyzing packets among the packets inspected at S320 by applying one or more sets of per-packet anomaly detection rules corresponding to respective potential per-packet issues. Such per-packet issues may include, but are not limited to, potential cyber threats that may be realized or otherwise observed via a particular packet. As a non-limiting example, a per-packet issue may be a structured query language (SQL) injection performed on a specific packet as part of a SQL injection attack. For example, the per-packet anomaly detection rules may define a SQL injection attack based on identification of a certain signature among data included in a packet.

Detecting per-packet issues may allow for supplementing the anomalies identified during the process and, in particular, identifies acute anomalies which may be detected in individual pieces of data in addition to the anomalies represented in changes of the data structure discussed as follows. In other words, anomalies other than excessive behavior anomalies may also be detected in addition to excessive behavior anomalies in order to further secure computing environments against potential cyber threats.

At S350, the updated worker node data structure is merged into a synced worker node data structure. In an embodiment, the worker node data structures may be merged by a syncer (e.g., the syncer 132, FIG. 1).

At S360, a current cycle represented by the synced worker node data structure (e.g., a cycle corresponding to the updated worker node data structure that was merged into the synced worker node data structure at a most recent iteration of S350) is compared to historical data. In an embodiment, the historical data includes a historical data structure, and S360 includes comparing the current synced worker node data structure of the current cycle acting as a first worker node data structure to the historical data structure acting as a second worker node data structure. More specifically, the historical data structure which is compared at S360 may be a most recent previously synced worker node data structure determined in the last cycle before the current cycle (i.e., the cycle immediately preceding the current cycle).

At S370, one or more changes in computing interface deployment are detected based on the comparison. More specifically, the changes are detected based on differences between the current synced worker node data structure and one or more historical data structures (e.g., synced data structures created for previous cycles). The changes in computing interface deployment may include, but are not limited to, deployment of new computing interfaces, reconfiguration or other changes to existing computing interfaces, other changes which may affect behavior with respect to the computing interfaces, combinations thereof, and the like.

As noted above, the detection of a change in computing interfaces deployed in a computing environment may be utilized to determine when to establish a new baseline. Accordingly, detecting changes as described above allows for accurately detecting changes and defining baselines only as needed, i.e., as new computing interfaces are deployed or otherwise when deployments change. Thus, such detection enables ongoing learning of behaviors accurately as well as efficiently in terms of computing resources utilized for learning and establishing baselines for different computing interfaces in the computing environment.

Figure 4:
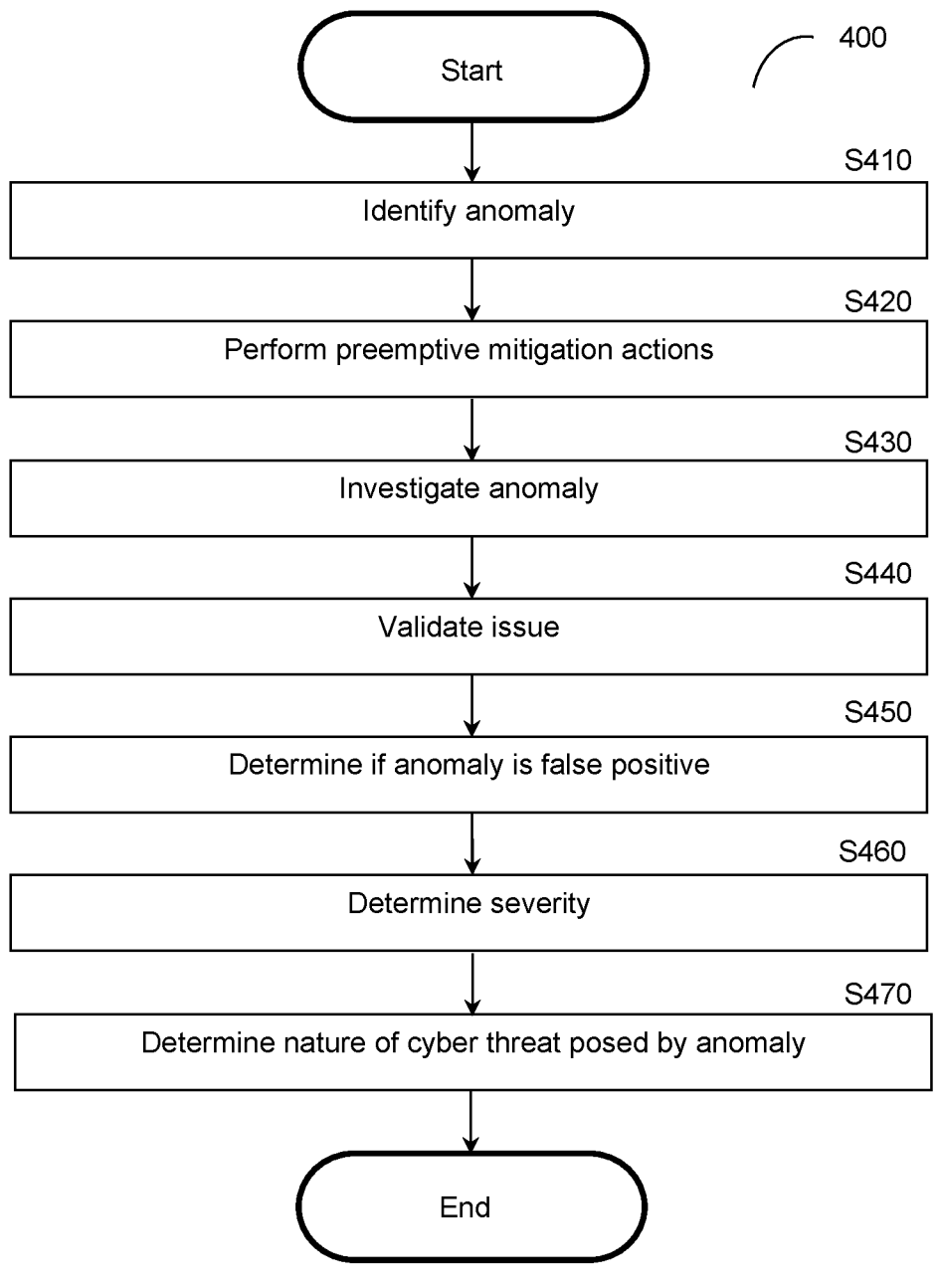
FIG. 4 is a flowchart illustrating a method for determining types of cyber threats based on computing interface usage according to an embodiment.

FIG. 4 is a flowchart 400 illustrating a method for determining types of cyber threats based on computing interface usage according to an embodiment. In an embodiment, the method is performed by the anomaly detector 130, FIG. 1.

At S410, an anomaly is identified. In an embodiment, the anomaly is a deviation from a baseline defined with respect to computing interface usage for a computing interface as described above such that the anomaly represents excessive or otherwise abnormal usage of the computing interface.

At S420, one or more preemptive mitigation actions may be performed with respect to the anomaly identified at S410. In an embodiment, S430 includes determining which preemptive mitigation actions to be performed based on, for example, a type of anomaly (e.g., as defined with respect to deviation from a baseline for one or more computing interface usage metrics). The preemptive mitigation actions may be performed in order to mitigate potential issues which might be caused by the anomaly pending resolution of an investigation to validate whether the anomaly actually presents a threat. In this regard, such preemptive mitigation actions may be used to minimize disruption to activity within a computing environment while responding to potential threats in a time sensitive manner.

At S430, the anomaly is investigated. Investigating the anomaly may include, but is not limited to, inspecting suspicious packets (e.g., packets which demonstrated behavior deviating from a threshold to trigger detection of the anomaly), inspecting responses to suspicious packets, checking logs (e.g., logs indicating whether computing interfaces are used for authentication), combinations thereof, and the like.

At S440, an issue posed by the anomaly is validated. In an embodiment, S420 includes applying one or more validation rules for an issue posed by the anomaly. In a further embodiment, the validation rules applied at S420 may depend on the issue posed by the anomaly. In yet a further embodiment, the issue posed by the anomaly may depend on a type of anomaly such that S420 may include determining the validation rules to apply based on the type of anomaly.

Non-limiting example validations that may be performed at S420 include inspecting suspicious packets to validate that a user has queried different computing interface endpoints in an unpredictable manner (e.g., a manner that deviates from a predetermined expected behavior above a threshold), validating that requests were successful, validating that sensitive information (e.g., information known to meet certain predetermined sensitivity criteria) was exposed, validating that a user has manipulated request parameters in a predetermined manner, validating that requests were unsuccessful, validating that a computing interface was used for login or authentication, validating that different combinations of credentials were used to access a computing interface, validating whether a computing interface was able to be accessed without authentication (e.g., by checking which types of resources were accessed without authentication), combinations thereof, and the like.

At optional S450, it is determined whether the anomaly is a false positive based on the investigation at S440. In an embodiment, S450 includes applying one or more false positive detection rules, and may further include determining which false positive detection rules to be applied based on a type of anomaly.

As a non-limiting example for determining a false positive when anomalies in computing interface usage metrics are indicative of a potential scraping attack or attempt, false positive rules to be applied may include a rule for checking whether resources accessed as part of the anomalous behavior (e.g., resources accessed as determined during the investigation noted above) were accessed by different users instead of the same user and, if so, the anomaly is determined to be a false positive.

As another non-limiting example for determining a false positive when anomalies in computing interface usage metrics are indicative of a potential credential spraying attack or attempt (e.g., an attack in which an attacker attempts to bypass authentication for an Internet-facing computing interface by enumerating credentials), false positive rules to be applied may include a rule for checking whether enumerated fields are credentials and, if the enumerated fields are not credentials, the anomaly is determined to be a false positive.

In some embodiments, if the anomaly is determined to be a false positive, then execution may terminate and the nature of the cyber threat posed by the anomaly is not determined, thereby conserving computing resources which would otherwise be spent analyzing the anomaly for type of cyber threat.

At S460, a severity of the anomaly is determined. The severity of the anomaly may be, but is not limited to, a severity of the underlying issue posed by the anomaly (such as, but not limited to, the issue validated at S420).

In an embodiment, S460 includes applying one or more severity determination rules. Such severity determination rules may be defined based on the type of anomaly (e.g., different types of anomalies may have different default or starting severities), one or more contextual factors (e.g., contextual factors that increase or mitigate the severity of an anomaly), or a combination thereof. Some non-limiting contextual factors include whether the computing interface is authenticated (e.g., which may mitigate the severity of certain kinds of attacks), whether the computing interface is exposed to external networks (e.g., Internet-facing, which may increase the severity of certain kinds of attacks), a combination thereof, and the like.

At S470, a nature of the cyber threat posed by the anomaly is determined. The nature of the cyber threat may be, but is not limited to, a type of attack, attempt at an attack, or other potential threat. The types may be predetermined categories of attack types, and may be defined based on certain combinations of abnormal or otherwise anomalous computing interface usage metrics.

Figure 5:
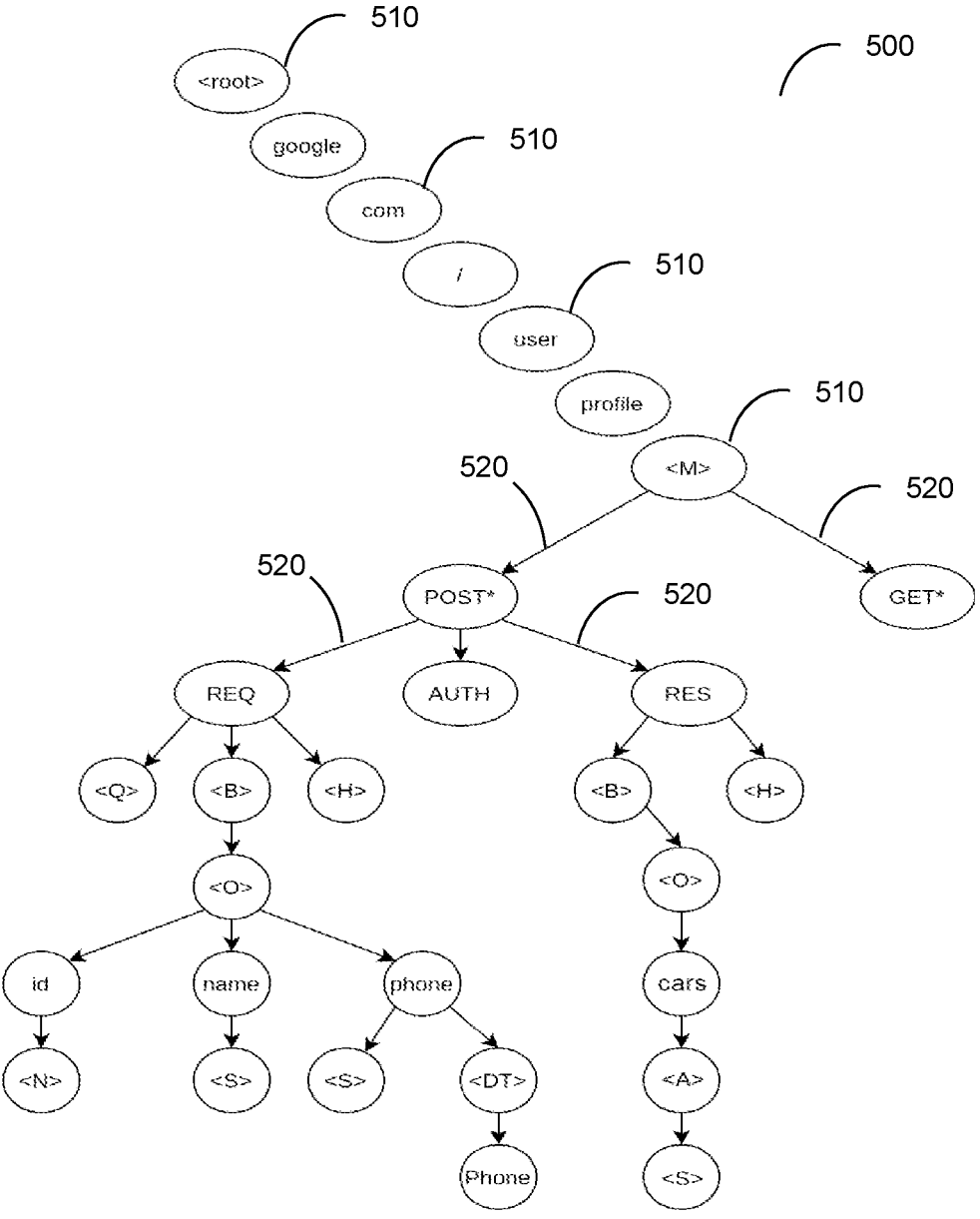
FIG. 5 is an illustration of a tree data structure managed by a worker node which may be utilized in accordance with various disclosed embodiments.

FIG. 5 is an illustration of a tree data structure 500 managed by a worker node which may be utilized in accordance with various disclosed embodiments.

As depicted in FIG. 5, the tree data structure 500 includes multiple nodes 510 as well as arrows 520. The nodes 510 include data denoting different aspects of instances of a call appearing in traffic, and the arrows 520 represent pointers acting as references between nodes.

In the non-limiting example tree data structure 500, a series of the nodes 510 begins with nodes representing different parts of a call including a particular path which may involve a computing interface (e.g., a root verb and parts broken up by slashes in the call). As a non-limiting example, the call represented by the tree data structure 500 may be "POST google.com/user/profile," where the root of the path is represented by the "<root>" node and other components of the path are represented as discrete nodes. A method node (e.g., the node 510 containing "<M>") may represent a method call to the address indicated by the path represented in the tree data structure 500, and may be linked to other nodes representing specific methods which have been observed to be used with respect to the path (e.g., "POST" and "GET").

Each node 510 may store statistical data or other information related to a given component (e.g., statistical data indicating how often "POST" is used as the method in a call to a given path as compared to "GET"). Accordingly, data in the nodes 510 collectively represent usage behavior which might related to computing interfaces, and trends across different tree data structures like the tree data structure 500 may be indicative of broader trends that can be leveraged to identify changes in computing interface deployment as described herein.

Figure 6:
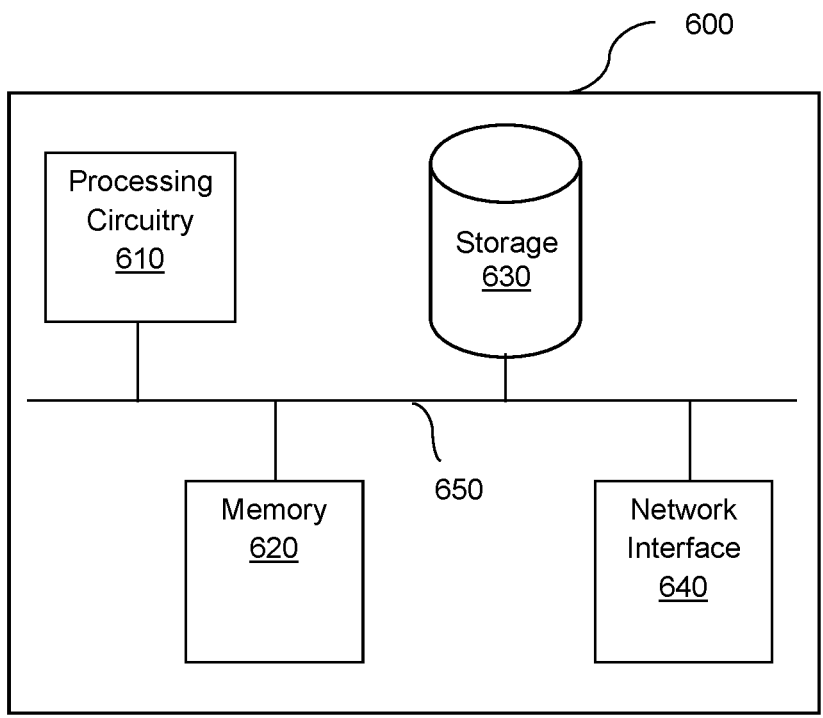
FIG. 6 is a schematic diagram of a hardware layer which may be utilized according to an embodiment.

FIG. 6 is an example schematic diagram of a hardware layer 600 which may be utilized according to an embodiment. The hardware layer 600 includes a processing circuitry 610 coupled to a memory 620, a storage 630, and a network interface 640. In an embodiment, the components of the hardware layer 600 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the hardware layer 600 to communicate with, for example, the database 120, the client devices 140, the servers 150, and the like.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for mitigating cyber threats based on excessive computing interface usage behavior, comprising:

creating a baseline with respect to at least one computing interface usage metric, wherein each computing interface usage metric is defined with respect to computing interface usage by a user, wherein creating the baseline further comprises training an anomaly detection machine learning model using a training set including a plurality of training values for the at least one computing interface metric;

detecting an anomaly in calls made by the user based on at least one deviation from the baseline above a threshold, wherein detecting the anomaly further comprises applying the anomaly detection machine learning model to a plurality of features including values of the at least one computing interface usage metric for the calls made by the user; and mitigating the detected anomaly.

2. The method of claim 1, further comprising:

detecting a change in computing interface deployment in a computing environment based on traffic across a plurality of paths in the computing environment.

3. The method of claim 2, wherein the at least one computing interface usage metric used to create the baseline is measured after the change in computing interface deployment is detected.

4. The method of claim 2, wherein detecting the change in computing interface deployment further comprises:

analyzing data related to the computing interface usage in a plurality of cycles, wherein analyzing the data in each cycle further comprises performing a comparison between at least one cycle result for the cycle and historical data, wherein the change in computing interface deployment is detected based on the comparisons in the plurality of cycles.

5. The method of claim 4, wherein analyzing the data in each cycle further comprises:

updating a first worker node data structure of a plurality of worker node data structures by a first worker node of a plurality of worker nodes, wherein each worker node is an instance of software assigned to a respective worker node data structure of the plurality of worker node data structures, wherein each worker node is an instance of software assigned to a respective worker node data structure of the plurality of worker node data structures; and merging the updated first worker node data structure with a first synced data structure into a second synced data structure, wherein the at least one cycle result for each cycle includes the second synced data structure created during the cycle.

6. The method of claim 5, wherein updating the first worker node data structure in each cycle further comprises:

parsing traffic by the first worker node; and inspecting packets of the parsed traffic by the first worker node, wherein the first worker node data structure is updated based on the inspection.

7. The method of claim 5, wherein each worker node data structure corresponds to a respective cycle of the plurality of cycles, wherein each worker node data structure includes a plurality of nodes, wherein each node of each worker node data structure includes data of calls made during the corresponding cycle.

8. The method of claim 1, further comprising:

determining a type of cyber threat for the detected anomaly, wherein the anomaly is mitigated based further on the determined type of cyber threat.

9. The method of claim 1, wherein the calls made by the user are a second plurality of calls, wherein the computing interface usage by the user is based on a first plurality of calls made by the user.

10. A non-transitory computer readable medium having stored thereon instructions for causing a processing circuitry to execute a process, the process comprising:

creating a baseline with respect to at least one computing interface usage metric, wherein each computing interface usage metric is defined with respect to computing interface usage by a user, wherein creating the baseline further comprises training an anomaly detection machine learning model using a training set including a plurality of training values for the at least one computing interface metric;

detecting an anomaly in calls made by the user based on at least one deviation from the baseline above a threshold, wherein detecting the anomaly further comprises applying the anomaly detection machine learning model to a plurality of features including values of the at least one computing interface usage metric for the calls made by the user; and mitigating the detected anomaly.

11. A system for mitigating cyber threats based on excessive computing interface usage behaviors, comprising:

a processing circuitry; and a memory, the memory containing instructions that, when executed by the processing circuitry, configure the system to:

create a baseline with respect to at least one computing interface usage metric, wherein each computing interface usage metric is defined with respect to computing interface usage by a user, wherein creating the baseline further comprises training an anomaly detection machine learning model using a training set including a plurality of training values for the at least one computing interface metric;

detect an anomaly in calls made by the user based on at least one deviation from the baseline above a threshold, wherein detecting the anomaly further comprises applying the anomaly detection machine learning model to a plurality of features including values of the at least one computing interface usage metric for the calls made by the user; and mitigate the detected anomaly.

12. The system of claim 11, wherein the system is further configured to:

detect a change in computing interface deployment in a computing environment based on traffic across a plurality of paths in the computing environment.

13. The system of claim 12, wherein the at least one computing interface usage metric used to create the baseline is measured after the change in computing interface deployment is detected.

14. The system of claim 12, wherein the system is further configured to:

analyze data related to the computing interface usage in a plurality of cycles, wherein analyzing the data in each cycle further comprises performing a comparison between at least one cycle result for the cycle and historical data, wherein the change in computing interface deployment is detected based on the comparisons in the plurality of cycles.

15. The system of claim 14, wherein the system is further configured to:

update a first worker node data structure of a plurality of worker node data structures by a first worker node of a plurality of worker nodes, wherein each worker node is an instance of software assigned to a respective worker node data structure of the plurality of worker node data structures, wherein each worker node is an instance of software assigned to a respective worker node data structure of the plurality of worker node data structures; and merge the updated first worker node data structure with a first synced data structure into a second synced data structure, wherein the at least one cycle result for each cycle includes the second synced data structure created during the cycle.

16. The system of claim 15, wherein the system is further configured to:

parse traffic by the first worker node; and inspect packets of the parsed traffic by the first worker node, wherein the first worker node data structure is updated based on the inspection.

17. The system of claim 15, wherein each worker node data structure corresponds to a respective cycle of the plurality of cycles, wherein each worker node data structure includes a plurality of nodes, wherein each node of each worker node data structure includes data of calls made during the corresponding cycle.

18. The system of claim 11, wherein the system is further configured to:

determine a type of cyber threat for the detected anomaly, wherein the anomaly is mitigated based further on the determined type of cyber threat.

19. The system of claim 11, wherein the calls made by the user are a second plurality of calls, wherein the computing interface usage by the user is based on a first plurality of calls made by the user.

* * * * *